Patented Jan. 16, 1923.

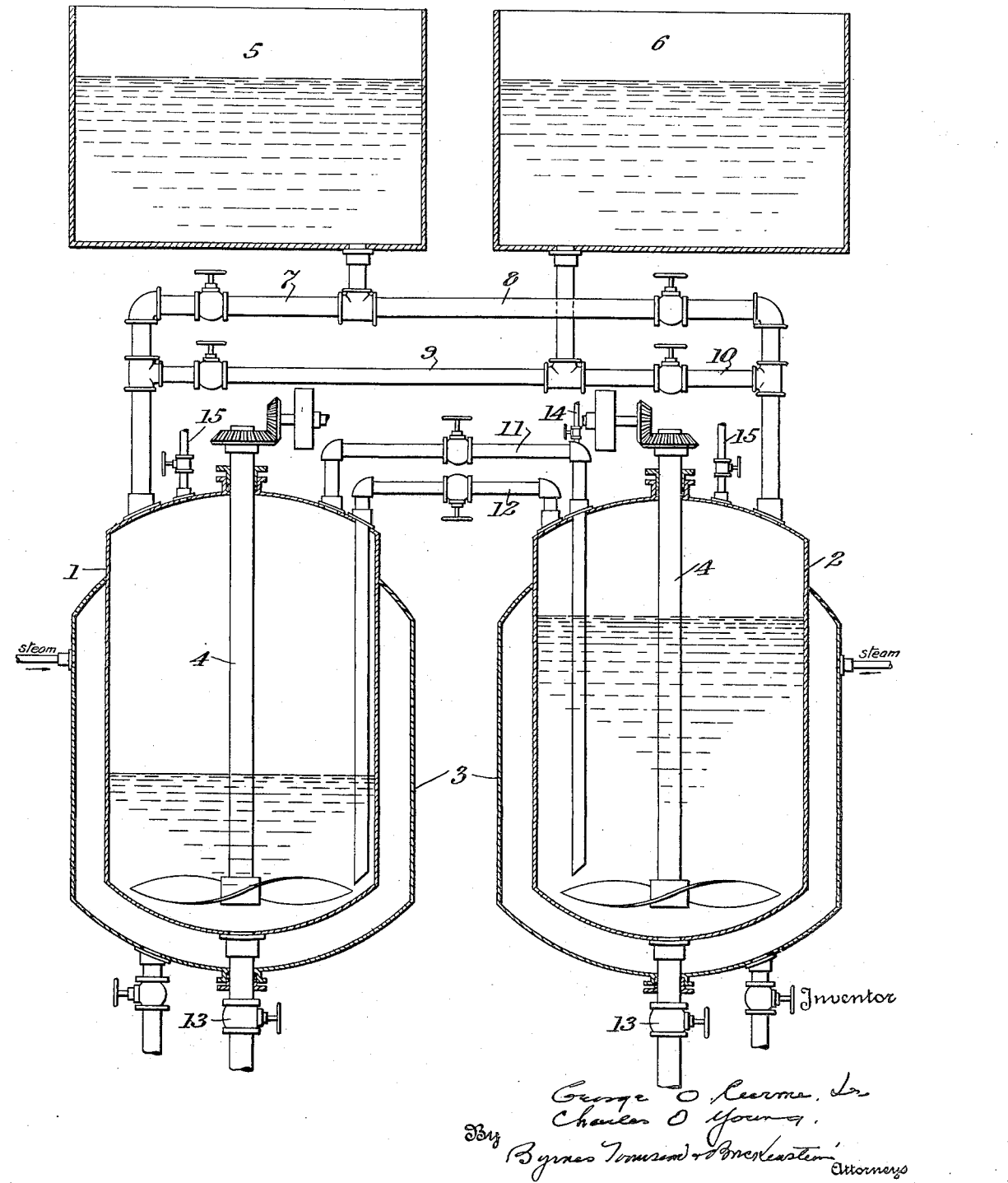

1,442,386

UNITED STATES PATENT OFFICE.

GEORGE O. CURME, JR., AND CHARLES O. YOUNG, OF PITTSBURGH, PENNSYLVANIA, ASSIGNORS TO UNION CARBIDE COMPANY, A CORPORATION OF VIRGINIA.

PROCESS OF MAKING GLYCOLS.

Application filed January 31, 1920. Serial No. 355,491.

*To all whom it may concern:*

Be it known the we, (1) GEORGE O. CURME, Jr. and (2) CHARLES O. YOUNG, citizens of the United States, residing at Pittsburgh, in the county of Allegheny and State of Pennsylvania, have invented certain new and useful Improvements in Processes of Making Glycols, of which the following is a specification.

The object of this invention is the provision of a simple and efficient process for the production of ethylene or propylene glycol from the corresponding chlorhydrin. The formation of these glycols takes place under substantially identical conditions; and while the invention is not limited to the specific operating conditions described below, these conditions are those which have been found in practice to afford substantially optimum results.

The formation of the glycol proceeds in accordance with the known reaction, involving hydrolysis of the chlorhydrin by an alkali metal bicarbonate in aqueous solution. The reaction may be expressed as follows:

(1) $C_2H_4OHCl + NaHCO_3 =$
$C_2H_4(OH)_2 + NaCl + CO_2$.

For a full understanding of the invention reference is made to the accompanying drawing, illustrating one type of apparatus suitable for carrying the invention into effect.

The apparatus shown comprises two similar closed kettles or reactors 1 and 2, each provided with a steam jacket 3 and a mechanical stirring device 4. 5 represents a storage reservoir for caustic soda solution and 6 a storage reservoir for chlorhydrin solution. The reservoir 5 is connected by valved pipes 7 and 8 with the kettles 1 and 2 respectively; and reservoir 6 is similarly connected through the valved pipes 9 and 10. 11 is a valved conduit extending from the upper part of kettle 1 to a point near the bottom of kettle 2; and 12 a similar valved connection leading from the upper part of kettle 2 to the lower part of kettle 1. Each kettle is provided with a valved discharge pipe 13.

The operation is as follows:

A solution of caustic soda, preferably containing approximately 20% of NaOH, is introduced through pipe 8 into kettle 2. Carbon dioxid is then admitted in the cold, for example through inlet pipe 14, and immediately combines with the caustic soda to form bicarbonate according to the equation:

(2) $NaOH + CO_2 = NaHCO_3$.

When the sodium hydroxid has been substantially or entirely converted to bicarbonate a charge of chlorhydrin solution, preferably containing the precise quantity of chlorhydrin necessary for complete reaction with the bicarbonate in accordance with equation (1), is added to the bicarbonate solution; the temperature is then raised to 70–80° C. with stirring of the mixture. Hydrolysis of the chlorhydrin proceeds smoothly with a constant evolution of carbon dioxid, and under normal conditions may be completed in about 4–6 hours.

In the meantime a further quantity of sodium hydroxid solution, equivalent to a second charge of chlorhydrin, has been delivered into kettle 1. The valve in pipe 11 is closed, and that in pipe 12 opened. The carbon dioxid liberated by the reaction in kettle 2 passes therefore into the cold caustic soda solution in kettle 1, thereby converting it into sodium bicarbonate.

The reaction mixture in kettle 2 is heated until the evolution of carbon dioxide ceases, indicating that all of the chlorhydrin has been decomposed. The charge is then withdrawn from kettle 2, a further quantity of sodium hydroxid solution is introduced into that kettle, and a new charge of chlorhydrin solution is added to the sodium bicarbonate solution in kettle 1. The process proceeds as before, with the exception that bicarbonate formation now takes place in kettle 2, and glycol formation in kettle 1.

It has been found best in practice to use approximately a 40% solution of chlorhydrin in this reaction, and so to regulate the concentration of the sodium hydroxid solution (and therefore the concentration of the sodium bicarbonate solution) that the actual concentration of chlorhydrin in the kettle at the beginning of the hydrolysis may approximate 20%.

A primary advantage of the procedure as above described is that it has been found in practice to increase materially the yield of glycol, as compared with the hydrolysis carried out in open vessels. It has been found that at the optimum working temperature the carbon dioxid evolved during the hydrolysis entrains considerable quantities of chlorhydrin; and under the operating conditions herein described this entrained product is wholly recovered by the absorption of the entraining gas in the caustic solution for the next operation. At the same time the carbon dioxid is re-used, being delivered to the caustic solution in the two kettles in alternation and subject only to a small operating loss. The new process therefore allows not only a decrease in operating cost but also an increase in operating efficiency.

It is necessary to guard against substantial losses of chlorhydrin through conversion into ethylene oxid by the caustic solution: however, in cold alkali solutions of the concentration mentioned above this decomposition is minimized and does not materially affect the yield.

It is possible also to use normal sodium carbonate instead of caustic soda for the absorption of the carbon dioxid. In such case, however, only one-half of the carbon dioxid regenerated by the hydrolysis will be absorbed; and the other half may be delivered through vent-pipe 15 and collected in a gas holder. Even in this case, however, the first half of the evolved gas contains the great bulk of the entrained chlorhydrin, so that satisfactory glycol yields are obtained.

The concentration of the glycol solution resulting from the reaction may be carried out in any appropriate way, as for example by distillation under reduced pressure, by distillation with steam, or even at atmospheric pressure.

We claim:—

1. Process of preparing glycols, comprising hydrolyzing a chlorhydrin by reacting thereon with an alkali-metal bicarbonate in solution; transforming the evolved carbon dioxid, carrying entrained chlorhydrin, into bicarbonate; and reacting with the resulting solution upon further quantities of chlorhydrin.

2. Process of preparing glycols, comprising hydrolyzing a chlorhydrin by reacting thereon with an alkali-metal bicarbonate in solution, the bicarbonate being used in amount substantially equivalent to the chlorhydrin; transforming the evolved carbon dioxid carrying entrained chlorhydrin into bicarbonate; and reacting with the resulting solution upon further quantities of chlorhydrin.

In testimony whereof, we affix our signatures.

GEORGE O. CURME, JR.
CHARLES O. YOUNG.